![United States Patent Office]  2,708,850
Patented May 24, 1955

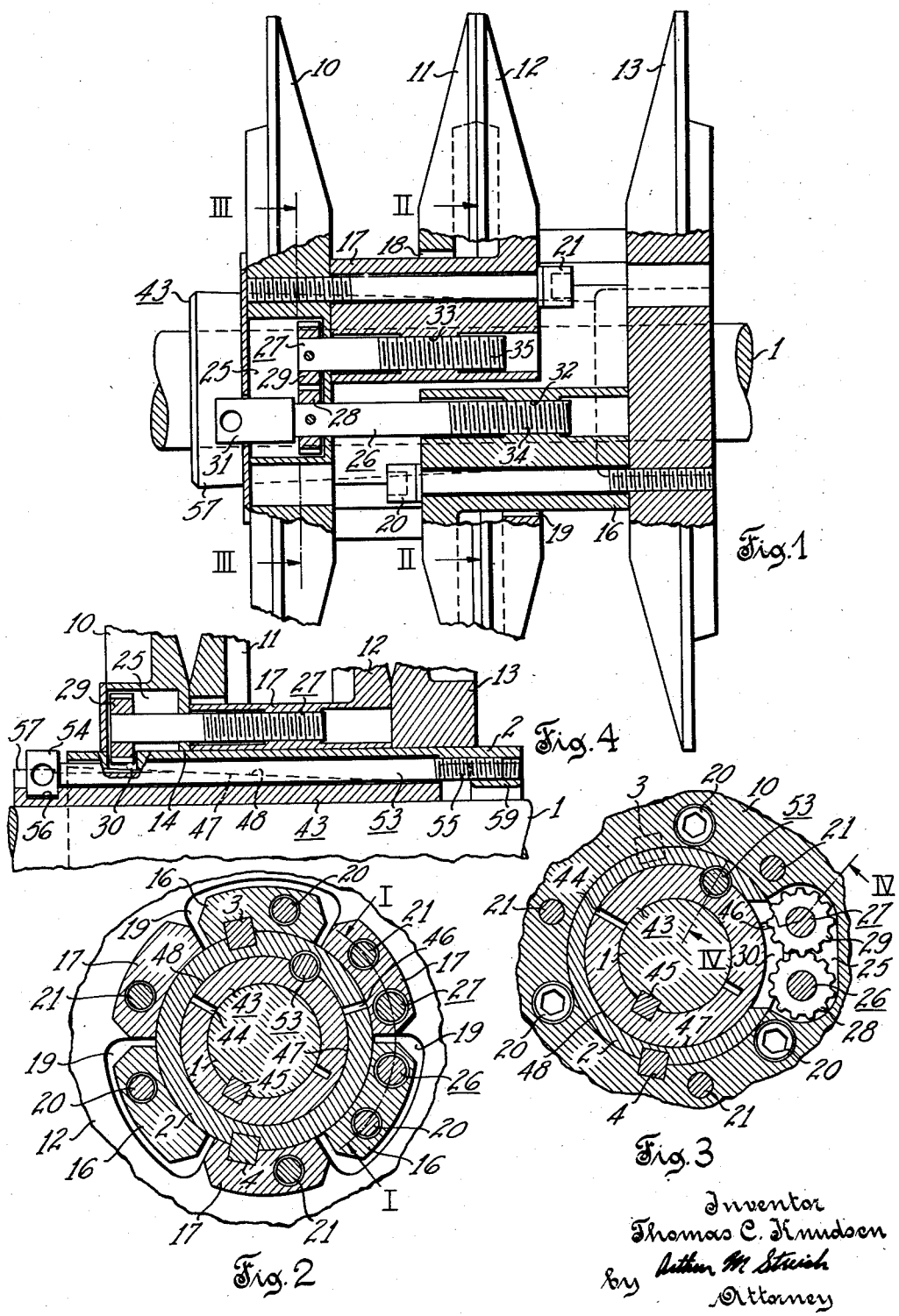

2,708,850

VARIABLE PITCH SHEAVE

Thomas C. Knudsen, Milwaukee, Wis., assignor to Allis-Chalmers Manufacturing Company, Milwaukee, Wis.

Application November 20, 1952, Serial No. 321,561

6 Claims. (Cl. 74—230.17)

This invention relates to an improvement in V-belt pulleys of the type in which opposed frusto-conical disks are axially movable toward and away from each other to vary the effective pitch diameter of the pulley.

In prior art devices of this type, in order to cause both disks of a pulley to move relative to each other when varying the pitch diameter, it was necessary to utilize an element having oppositely threaded portions. Such an oppositely threaded element is therefore not one which is of standard screw design and commercially readily available, but rather is an element which must be specially manufactured. This therefore results in increasing the cost of the unit. The nature of the present invention resides in providing a pulley with a new and improved adjusting mechanism utilizing like threaded adjusting elements which enable the pulley to be easily and quickly adjusted throughout a very wide range of pitch diameters by the operation of a single external adjusting means.

It is, therefore, a principal object of the invention to provide a pulley of simplified construction having parts that may be easily and inexpensively machined and assembled.

Other objects and advantages will appear from the following description of a structure illustrating an embodiment of the invention, reference being had to the accompanying drawing, in which:

Fig. 1 is a view of a multiple groove pulley assembly embodying the invention, shown partly in section along line I—I of Fig. 2;

Fig. 2 is a view shown in cross section taken on line II—II of Fig. 1;

Fig. 3 is a view shown in cross section taken on line III—III of Fig. 1; and

Fig. 4 is a fragmentary view in section taken on line IV—IV of Fig. 3.

The illustrated pulley assembly is shown mounted on a drive shaft 1, which may be either a driven or driving member. The pulley assembly has a rotary power transmission or support member 2 adapted for attachment to the rotary shaft 1 in the way illustrated in the drawing and described hereinafter or in various other ways known to those skilled in the art.

Support member 2 has a generally cylindrical external surface and is provided with two conventional longitudinal keyways in which keys 3 and 4 are disposed.

Provided on support member 2 are a series of disk elements 10, 11, 12 and 13. Disk 10, herein referred to as an end disk, is annular in form with a central opening bounded by a substantially continuous cylindrical bearing surface 14, broken only by a conventional keyway to fit key 4. Disk 13 is an annular end disk positioned at the opposite end of support member 2 and has a central opening bounded by a substantially continuous cylindrical bearing surface broken only by a conventional keyway to engage key 3. Disks 10 and 13 have frusto-conical belt engaging faces facing each other.

The scope of the invention includes a construction utilizing the end disks 10 and 13 alone as well as constructions in which end disks 10 and 13 are utilized with two or more intermediate disks. The illustrated intermediate disks 11 and 12, having oppositely facing frusto-conical belt engaging faces, are generally annular in form. The disks are arranged to form cooperating pairs of oppositely facing disks 10, 11 and 12, 13. The faces of each pair of disks 10, 11 and 12, 13 are movable toward and away from each other to increase or decrease the effective pitch diameter of the pulley.

A preferred way of arranging and mounting the disks to form the cooperating pairs 10, 11 and 12, 13 is illustrated, although other known ways may be utilized within the scope of the invention. Intermediate disks 11 and 12 are respectively connected with a plurality of axially extending lugs 16 and 17 which are circumferentially spaced so that the lugs on each disk form an annular series, as shown in cross section in Fig. 2. Between the respective lugs 16 of disk 11 and lugs 17 of disk 12 are openings 18 and 19, such that in assembly the set of lugs on each disk is interdigitated and passes through the openings between the set of lugs on the other disk. Tie bolts 20 and 21 are passed through respective holes in the lugs 16, 17, and clamp the disks together to form two groups of interdigitated disks 10, 12 and 11, 13. The two disk groups 10, 12 and 11, 13 are axially movable as units relative to each other and support member 2 to vary the distance between the cooperating pairs of disks 10, 11 and 12, 13. One of the lugs 16 has a longitudinal keyway cooperating with key 3, and one of the lugs 17 has a longitudinal key cooperating with key 4 to prevent rotation of the respective groups of disks 10, 12 and 11, 13 relative to the support member 2.

In the present invention at least a pair of actuating screws 26 and 27 is provided. The screws are interconnected by counterrotating means, shown here as spur gears 28 and 29 provided on at least one and the same end of each of the screws. Disk 10 is provided with an annular recess 25 for housing the spur gears 28 and 29. The screws 26 and 27 are mounted on the support member 2 with their axes of orientation parallel to the axis of the support member 2. The screws 26, 27 and gears 28, 29 are held in position relative to the support member 2 by means here shown as an arcuate slot 30 in the periphery of support member 2 which prevents axial movement of the gears relative to support member 2. The spur gears 28 and 29 counterrotatively interconnected the actuating screws 26 and 27. External means, here shown as a knob 31 connected to one of the screws 26, is provided to rotate the actuating screws 26 and 27.

Actuating screw 26 is connected to disk group 11, 13, and screw 27 is connected to disk group 10, 12. Rotation of screw 26 and the resulting counterrotation of screw 27, moves both disk groups 11, 13 and 10, 12, axially in opposite directions and varies the distance between the cooperating pairs of disks 10, 11 and 12, 13 to increase or decrease the effective pitch diameter of the pulleys formed by the cooperating pairs of disks.

The screws 26, 27 are illustrated as being connected to disk groups 10, 12 and 11, 13 by engagement with threaded bores 32 and 33 formed in the lugs 16 and 17. An advantage of providing threaded bores 32 and 33 in the axially extended lugs 16 and 17 is that the entire length of the threaded sections 34 and 35 of the actuating screws 26 and 27 remain enclosed during relative movement of the two groups of disks and thus are protected from being corroded by exposure to the atmosphere.

When the disks of each cooperating pair of mutually facing disks 10, 11 and 12, 13 are in a position such that the rear surfaces of the disks 11 and 12 abut, as in the position shown in Fig. 1 of the drawing, the effective pitch diameter of the pulley is at its smallest. By virtue of the manner in which the actuating screws 26 and 27 cooperate with the disks 11 and 12 and support member 2 as described above, the pulley can be adjusted to assume various pitch diameters throughout a wide range, in that disks 10 and 11, as well as disks 12 and 13, may be moved toward each other until they reach abutting relation in which position the effective pitch diameter of the pulley is at its greatest.

Assembly of the unit is accomplished by first placing the actuating screws 26 and 27, with connected spur gears 28 and 29, into position on the external surface of the support member 2, then mounting disks 10 and 11 from the right hand side and threading disk 11 on the threaded section 34 of screw 26 to a predetermined position, then mounting disks 12 and 13 also from the right hand side and threading disk 12 on the threaded section 35 of screw 27 to a predetermined position, and then clamping the disks together in the two groups 10, 12 and 11, 13 by inserting and tightening clamping screws 20 and 21.

A preferred way of attaching support member 2 to shaft 1 is illustrated in the drawing. Mounted directly on the shaft 1 is a sleeve 43 centrally bored for a sliding fit on the shaft 1 and split throughout its entire length along a radial plane as at 44, the split or cut being of sufficient width to permit sleeve 43 to be contracted by clamping, to tightly grip shaft 1. The shaft 1 and sleeve 43 may be provided with conventional key means indicated at 45. Outer surface 48 of the sleeve 43 is tapered from end to end. Support member 2 is illustrated as being radially expansible by virtue of being split throughout its length along a substantially radial plane as at 46 and is provided with a tapered bore 47 having the same taper angle as the outer surface 48 of the sleeve 43. Axial movement of support member 2 with respect to sleeve 43 causes the sleeve 43 to contract radially so as to grip shaft 1 and causes support member 2 to expand radially so as to expand against and clamp disks 10, 11, 12 and 13 to the support member 2. The clamping action unites all the parts into a rigid power transmission unit.

A screw 53, having a head portion 54 and a threaded section 55, is provided for moving support member 2 axially with respect to sleeve 43 to effect clamping and unclamping of the disks 10, 11, 12 and 13 to the shaft 1. A slot 56 is provided in hub portion 57 of the sleeve 43 in which the head portion 54 of screw 53 is extendible to anchor screw 53 axially with respect to the sleeve 43. A hole for receiving the shank portion of the screw 53 is formed partly in the internal surface of the support member 2 and partly in the external surface of the sleeve 43. Support member 2 has an internal annular lug 59 at one end thereof provided with a threaded bore for receiving the threaded section 55 of the screw 53. Rotation of the screw 53, therefore, causes axial movement of support member 2 with respect to sleeve 43 to effect clamping of the disks to the shaft 1.

The screw 53 may be rotated to unclamp the disks from the shaft 1 so that the desired pitch diameter may be obtained by rotatably adjusting the actuating screws 26 and 27. The screw 53 may then be rotated to clamp the disks to shaft 1 to unite all the parts into a rigid power transmission unit.

The particular embodiment of the invention illustrated and described herein is illustrative only, and the invention includes such other modifications and equivalents as may readily occur to those skilled in the art, within the scope of the appended claims.

It is claimed and desired to secure by Letters Patent:

1. A variable pitch sheave comprising a support member having a generally cylindrical external surface, a first annular disk slidably mounted on said external surface of said support member, a second annular disk slidably mounted on said external surface of said support member, a pair of actuating screws, means carried by said first disk for threadingly engaging with and positioning one actuating screw of said pair for rotation about an axis parallel to the longitudinal axis of said support member, means carried by said second disk for threadingly engaging with and positioning the other actuating screw of said pair side by side with said one actuating screw for rotation about an axis parallel to the longitudinal axis of said support member, counterrotating means mounted on one end of said one actuating screw and on the adjacent end of said other actuating screw, said counterrotating means engaging each other to interconnect said actuating screws, said support member having a transverse arcuate slot formed in said external surface adjacent an extremity of said support member, said counterrotating means extending into said slot to axially fix said counterrotating means and said screws relative to said support member, and means connected with said one actuating screw of said pair for rotating said one actuating screw in either direction, with said counterrotating means transmitting counterrotation to said other actuating screw of said pair to selectively cause said disks to move axially toward and away from each other.

2. A variable pitch sheave comprising a support member having a generally cylindrical external surface, a first annular disk slidably mounted on said external surface of said support member, a second annular disk slidably mounted on said external surface of said support member, a pair of actuating screws, means carried by said first disk for threadingly engaging with and positioning one actuating screw of said pair for rotation about an axis parallel to the longitudinal axis of said support member, means carried by said second disk for threadingly engaging with and positioning the other actuating screw of said pair side by side with said one actuating screw for rotation about an axis parallel to the longitudinal axis of said support member, counterrotating means mounted on one end of said one actuating screw and on the adjacent end of said other actuating screw, said counterrotating means engaging each other to interconnect said actuating screws, said support member having a transverse arcuate slot formed in said external surface adjacent an extremity of said support member, said counterrotating means extending into said slot to axially fix said counterrotating means and said screws relative to said support member, one of said disks being provided with a recess for housing said counterrotating means, and means connected with said one actuating screw of said pair for rotating said one actuating screw in either direction, with said counterrotating means transmitting counterrotation to said other actuating screw of said pair to selectively cause said disks to move axially toward and away from each other.

3. A variable pitch sheave comprising a radially expansible support member having a generally cylindrical external surface, a first annular disk slidably mounted on said external surface of said support member, a second annular disk slidably mounted on said external surface of said support member, a pair of actuating screws, means carried by said first disk for threadingly engaging with and positioning one actuating screw of said pair for rotation about an axis parallel to the longitudinal axis of said support member, means carried by said second disk for threadingly engaging with and positioning the other actuating screw of said pair side by side with said one actuating screw for rotation about an axis parallel to the longitudinal axis of said support member, spur gears mounted on one end of said one actuating screw and on the adjacent end of said other actuating screw, said spur gears engaging each other to interconnect said actuating screws, said support member having a transverse arcuate slot formed in said external surface adjacent an extremity of said support member, said spur gears extending into said slot to axially fix said spur gears and said screws relative to said support member, one of said disks being provided with a recess for housing said spur gears, and means connected with said one actuating screw of said pair for rotating said one actuating screw in either direction, with said spur gears transmitting counterrotation to said other actuating screw of said pair to selectively cause said disks to move axially toward and away from each other.

4. A variable pitch sheave comprising a support member having a generally cylindrical external surface, a first group of axially spaced annular disks clamped together as a unitary set slidably mounted on said external surface of said support member, a second group of axially spaced annular disks slidably mounted on said external surface of said support member in respective alternating relation with respect to the disks of said first group and clamped together to form a unitary set, a pair of actuating screws, one disk of said first group having axially extending lugs with one of said lugs having a threaded bore for engaging with and positioning one actuating screw of said pair for rotation about an axis parallel to the longitudinal axis of said support member, one disk of said second group having axially extending lugs with one of said lugs having a threaded bore for engaging with and positioning the other actuating screw of said pair for rotation about an axis parallel to the longitudinal axis of said support member, counterrotating means mounted on one end of said one actuating screw and on the adjacent end of said other actuating screw, said counterrotating means engaging each other to interconnect said actuating screws, said support member having a transverse arcuate slot formed in said external surface adjacent an extremity of said support member, said counterrotating means extending into said slot to axially fix said counterrotating means and said screws relative to said support member, and means connected with said one actuating screw of said pair for rotating said one actuating screw in either direction, with said counterrotating means transmitting counterrotation to said other actuating screw of said pair to selectively cause said groups of disks to move axially toward and away from each other.

5. A variable pitch sheave comprising a support member having a generally cylindrical external surface, a first group of axially spaced annular disks clamped together as a unitary set slidably mounted on said external surface of said support member, a second group of axially spaced annular disks slidably mounted on said external surface of said support member in respective alternating relation with respect to the disks of said first group and clamped together to form a unitary set, a pair of actuating screws, one disk of said first group having axially extending lugs with one of said lugs having a threaded bore for engaging with and positioning one actuating screw of said pair for rotation about an axis parallel to the longitudinal axis of said support member, one disk of said second group having axially extending lugs with one of said lugs having a threaded bore for engaging with and positioning the other actuating screw of said pair for rotation about an axis parallel to the longitudinal axis of said support member,
counterrotating means mounted on one end of said one actuating screw and on the adjacent end of said other actuating screw, said counterrotating means engaging each other to interconnect said actuating screws, said support member having a transverse arcuate slot formed in said external surface adjacent an extremity of said support member, said counterrotating means extending into said slot to axially fix said counterrotating means and said screws relative to said support member, the end disk of one of said groups of disks being provided with a recess for housing said counterrotating means, and means connected with said one actuating screw of said pair for rotating said one actuating screw in either direction, with said counterrotating means transmitting counterrotation to said other actuating screw of said pair to selectively cause said groups of disks to move axially toward and away from each other.

6. A variable pitch sheave comprising a radially expansible support member having a generally cylindrical external surface, a first group of axially spaced annular disks clamped together as a unitary set slidably mounted on said external surface of said support member, a second group of axially spaced annular disks slidably mounted on said external surface of said support member in respective alternating relation with respect to the disks of said first group and clamped together to form a unitary set, a pair of actuating screws, one disk of said first group having axially extending lugs with one of said lugs having a threaded bore for engaging with and poistioning one actuating screw of said pair for rotation about an axis parallel to the longitudinal axis of said support member, one disk of said second group having axially extending lugs with one of said lugs having a threaded bore for engaging with and positioning the other actuating screw of said pair for rotation about an axis parallel to the longitudinal axis of said support member, spur gears mounted on one end of said one actuating screw and on the adjacent end of said other actuating screw, said spur gears engaging each other to interconnect said actuating screws, said support member having a transverse arcuate slot formed in said external surface adjacent an extremity of said support member, said spur gears extending into said slot to axially fix said spur gears and said screws relative to said support member, the end disk of one of said groups of disks being provided with a recess for housing said spur gears, and means connected with said one actuating screw of said pair for rotating said one actuating screw in either direction, with said spur gears transmitting counterrotation to said other actuating screw of said pair to selectively cause said groups of disks to move axially toward and away from each other.

References Cited in the file of this patent

UNITED STATES PATENTS

| | | |
|---|---|---|
| 1,890,500 | Dehuff | Dec. 13, 1932 |
| 2,545,327 | Williams | Mar. 13, 1951 |
| 2,610,515 | Williams | Sept. 16, 1952 |

FOREIGN PATENTS

| | | |
|---|---|---|
| 462,625 | Great Britain | Mar. 12, 1937 |